United States Patent
Paulson

(10) Patent No.: US 9,339,043 B1
(45) Date of Patent: May 17, 2016

(54) SPREADING TOOL

(71) Applicant: Paulson Products, LLC, Dubuque, IA (US)

(72) Inventor: Jeffrey Paulson, Dubuque, IA (US)

(73) Assignee: Paulson Products, LLC, Dubuque, IA (US)

(*) Notice: Subject to any disclaimer, the term of this patent is extended or adjusted under 35 U.S.C. 154(b) by 0 days.

(21) Appl. No.: 14/818,526

(22) Filed: Aug. 5, 2015

Related U.S. Application Data

(60) Provisional application No. 62/148,218, filed on Apr. 16, 2015.

(51) Int. Cl.
*A22B 5/00* (2006.01)

(52) U.S. Cl.
CPC ........................................ *A22B 5/00* (2013.01)

(58) Field of Classification Search
CPC ........ A22C 17/02; A22C 5/0017; A22B 5/00; A22B 5/0023; A22B 5/0029; A22B 5/0047; A22B 5/16; A22B 5/161; A22B 5/168
USPC .................. 452/102–105, 185, 187–190, 197
See application file for complete search history.

(56) References Cited

U.S. PATENT DOCUMENTS

| | | | | |
|---|---|---|---|---|
| 828,620 A * | 8/1906 | Martin | ...................... | A22B 5/06 452/189 |
| 3,921,327 A * | 11/1975 | Casazza | .................. | A01K 97/18 294/118 |
| 4,023,303 A * | 5/1977 | Maunu | ................... | A01K 97/18 43/53.5 |
| 4,580,317 A * | 4/1986 | Timothy | .................. | A22B 5/06 294/81.56 |
| 4,901,397 A * | 2/1990 | Pursell | ..................... | A22B 5/06 452/197 |
| 5,071,389 A * | 12/1991 | Castle | ....................... | A22B 5/06 452/187 |
| 5,304,091 A * | 4/1994 | Wilkinson | ............... | A22B 5/06 452/189 |
| 6,132,305 A * | 10/2000 | Witherell | ................. | A22B 5/06 452/189 |
| 2004/0157542 A1 | 8/2004 | Bloch | | |

* cited by examiner

*Primary Examiner* — Richard Price, Jr.
(74) *Attorney, Agent, or Firm* — Jason R. Sytsma; Shuttleworth & Ingersoll, PLC

(57) ABSTRACT

A spreading tool comprises a first arm having a pivot end and an engagement end and a second arm having a pivot end and an engagement end. A connector combines the pivot end of the first arm with the pivot end of the second arm for rotational movement between a closed position and an open position. A handle is combined to the second arm and positioned apart from the connector so that the connector is positioned between the handle and the engagement end of the first arm and the engagement end of the second arm for the entire path of travel between the open and closed positions.

12 Claims, 4 Drawing Sheets

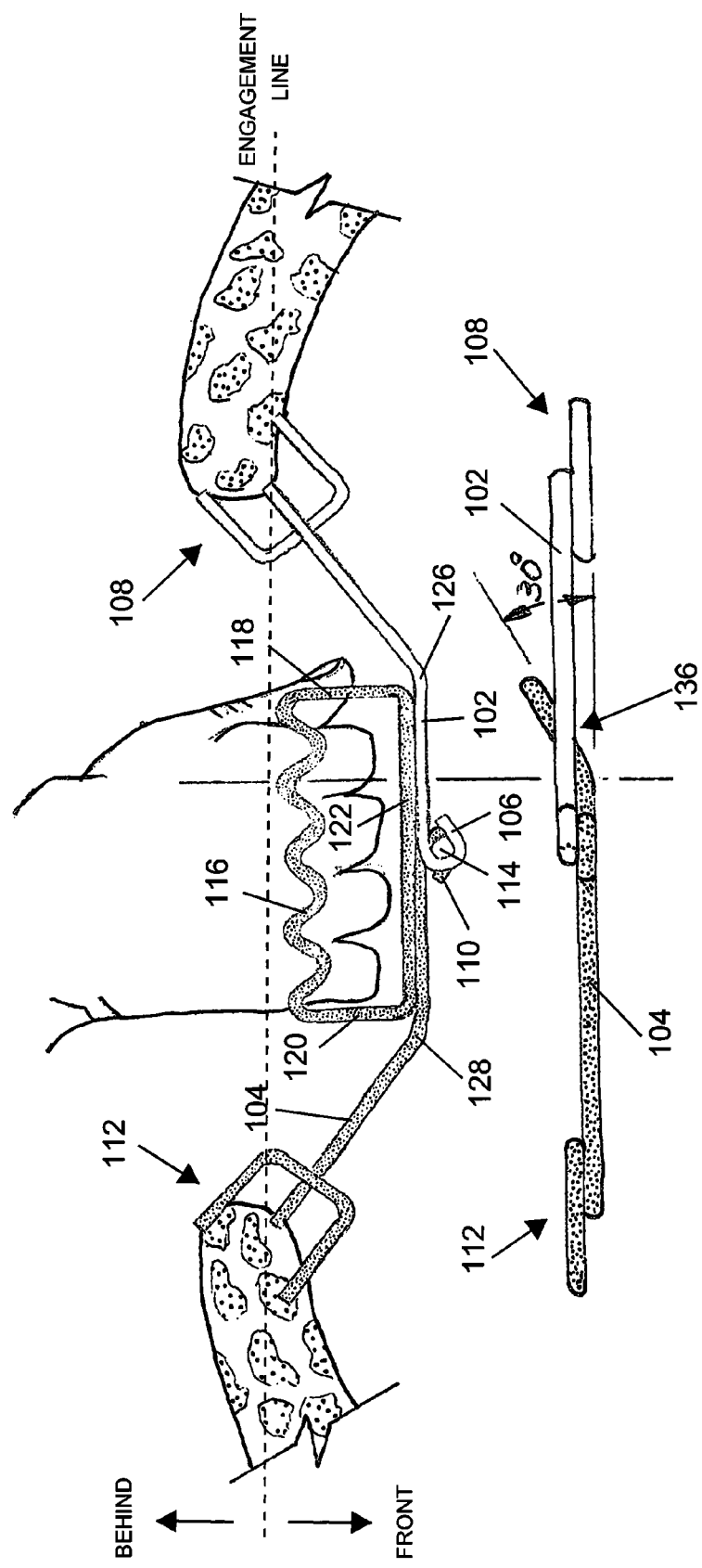

SPREADING TOOL

This application claims priority to U.S. provisional patent application No. 62/148,218 filed on Apr. 16, 2015 the contents of which are hereby incorporated by reference herein.

This disclosure relates to a spreading tool, and more particularly, this disclosure relates to a single-handedly operated spreading tool with side handle.

BACKGROUND

Spreading tools have many applications. One of which is for working on animal carcasses. When a hunter kills an animal, especially large game, such as deer or family cervidae (big game), the first job is to dress (i.e. gut) the animal in order to butcher and prepare the meat for consumption. The interior of the animal needs to cool down to slow bacteria formation. This can be done by cutting the cartilage in the sternum and inserting something to hold the rib cage apart. This also allows access to the interior of the animal.

Many spreading tools have been conceived to hold or spread apart the rib cage, but these tools are difficult to operate or interfere with the user's ability to work effectively. An example of one such tool found in U.S. Pat. No. 4,901,397, which includes a pair of opposite elongated arms with a rotational axle near the top end of the arm establishing a pivot point perpendicular to the length of the arms and combined by a spring to bias the arms closed. Handles are positioned on each arm between the engaging means and the pivot point to allow the operator to spread the tool open by pulling the arms away from each other. Such a tool is considered to operate as a class three lever mechanism where the effort (applied at in the middle at the handles) is always applied between the fulcrum (pivot) and the resistance. Importantly the effort required to operate the lever is always greater than the resistance.

What is needed is a tool that is easier to operate.

SUMMARY

Disclosed is a spreading tool comprising a first arm having a pivot end and an engagement end and a second arm having a pivot end and an engagement end. A connector combines the pivot end of the first arm with the pivot end of the second arm for rotational movement between a closed position and an open position. A handle is combined to the second arm and positioned apart from the connector so that the connector is positioned between the handle and the engagement end of the first arm and the engagement end of the second arm for the entire path of travel between the open and closed positions to create a class one lever mechanism that can more easily spread an object apart and hold it open.

More specifically, the handle extends partially lengthwise with respect to the second arm and generally at least one inch from the second arm in order to provide sufficient distance for a user to wrap fingers around the handle. As the user simultaneously exerts a linear force towards the carcass and a torsional force by a clockwise twist of the wrist (known as a force couple) on the handle the connector moves past an over center position as the engagement end of the first arm and the engagement end of the second arm move from the closed position to the open position such that connector is positioned behind the engagement end of the first arm and the engagement end of the second arm in the closed position and moves in front of the engagement end of the first arm and the engagement end of the second arm in the open position so that the connector is inside an object being spread apart by spreading tool.

The first arm of the spreading tool further comprises an elbow between the pivot end and the engagement end. The second arm also comprises an elbow between the pivot end and the engagement end. The elbow on the first end and the elbow on the second end cooperate to position the connector in the open position from a plan view perspective ahead of the engagement end of the first arm and the engagement of the second arm.

A first longitudinal member is combined to the second arm, a lateral member is combined on each side of the first longitudinal member, and the handle extends between the lateral member on each side of the first longitudinal member and is positioned apart from the first longitudinal member.

In an embodiment, the engagement end of the first arm and the engagement end of the second arm comprises a forked tines, with the tines construction plane parallel to the horizontal operating plane of the tool, for penetrating flesh on each side of an animals rib cage to prevent the tool from rotating about its horizontal operating plane, though other types of engagement ends are contemplated.

BRIEF DESCRIPTION OF THE DRAWINGS

FIG. 4 illustrates the spreading tool of FIG. 1 fully open position.

DETAILED DESCRIPTION

Figure 1:
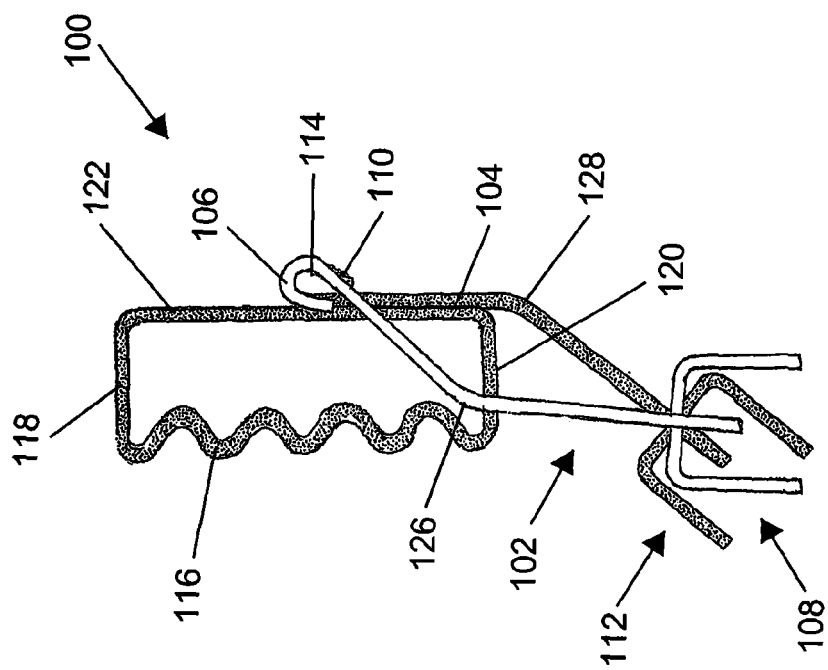
FIG. 1 is a top view of the spreading tool according to this disclosure.

FIG. 1 shows spreading tool 100 in the closed position. Spreading tool 100 comprises a first arm 102 and a second arm 104. First arm 102 has a pivot end 106 and an engagement end 108 at the opposite end of first arm 102. Second arm 104 has a pivot end 110 and an engagement end 112 at the opposite end of second arm 104. A connector 114 combines pivot end 106 of first arm 102 with pivot end 110 of second arm 104 to allow rotational movement of second arm 104 with respect to first arm 102 around an axis between a closed and open position.

Figure 2:
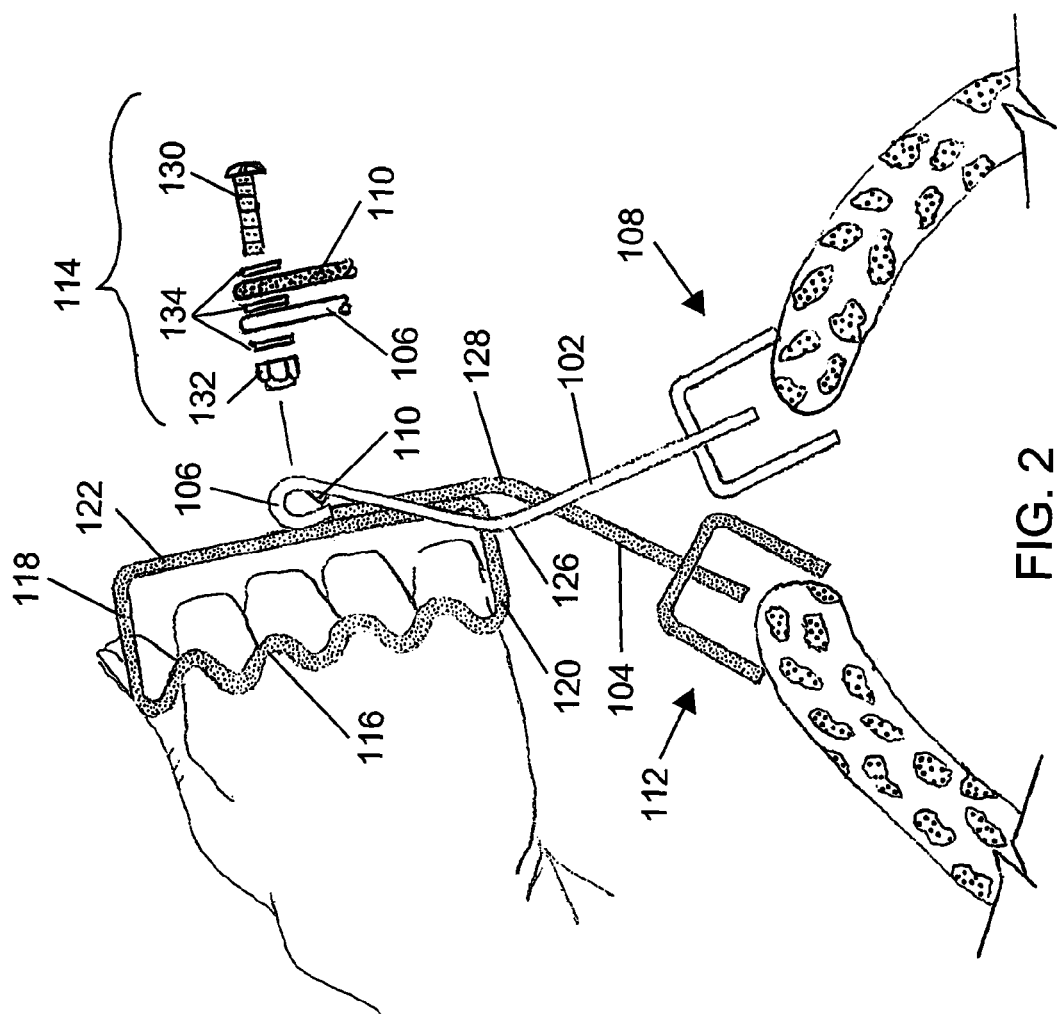
FIG. 2 illustrates how the spreading tool of FIG. 1 can be held in the closed position.

Connector 114 can take many forms, but one particular example is shown in FIG. 2. Connector 114 can include a threaded bolt 130 through eyes of each pivot end 106, 110 with one or more washers 134 secured with a nut 132. This arrangement creates an axis extending through connector 114 that is perpendicular to the horizontal operating plane of spreading tool 100 that allows second arm 104 to rotate with respect to first arm 102 and move connector 114 and the axis from a position behind engagement end 108 and engagement end 112 (as shown in FIG. 1) to a position in front of engagement end 108 and engagement end 112 (as shown in FIG. 4).

A handle 116 extends longitudinally with respect to second arm 104. A first longitudinal member 122 is combined to and extends a partial length of second arm 104. A lateral member 118 and a lateral member 120 are combined on each side of first longitudinal member 122. Handle 116 is combined to and extends between lateral member 118 and lateral member 120 to position handle 116 a part from second arm 104. Lateral member 118 and lateral member 120 can be generally at least one inch long or more in order to position handle 116 away from connector 114 and provide a user with sufficient room to wrap fingers around handle 116. Handle 116 can be straight, sinusoidal, or any other ergonomic shape. Handle 116 has a center that is laterally aligned with the axis. With this configuration, handle 116 is configured for gripping with the users fingers wrapping around handle 116 and the thumb capable of resting against or pressing laterally against lateral member 118.

Figure 3:
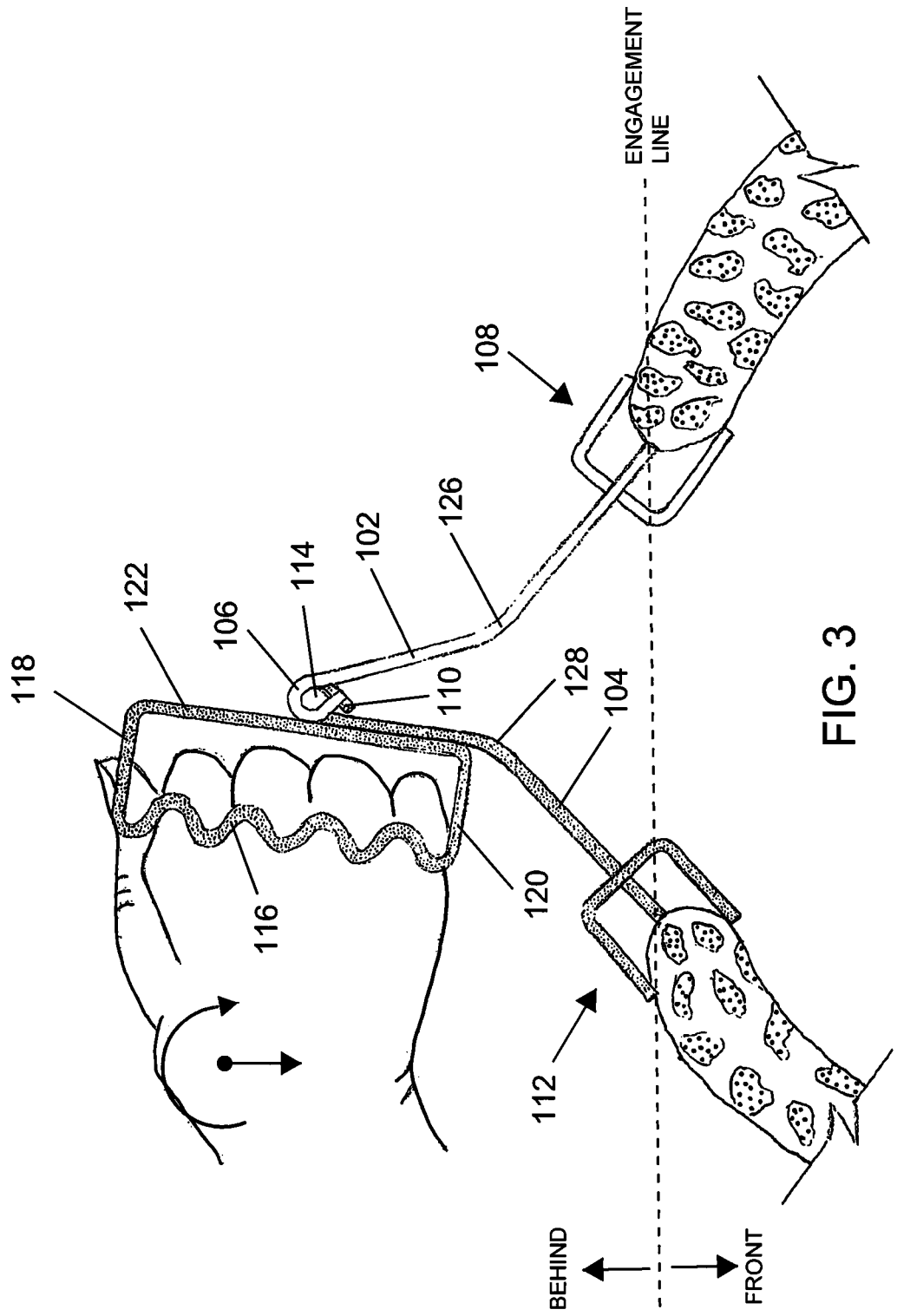
FIG. 3 illustrates the spreading tool of FIG. 1 in a partially open position.

With reference to FIG. 3, as the user simultaneously exerts a linear force towards the carcass (represented by the downward arrow) and a torsional force by a clockwise twist of the wrist (represented by the clockwise arrow) (collectively, known as a force couple) on the handle the connector moves past an over center position (FIG. 4) as the engagement end of the first arm and the engagement end of the second arm move from the closed position to the open position such that connector is positioned behind the engagement end of the first arm and the engagement end of the second arm in the closed position and moves in front of the engagement end of the first arm and the engagement end of the second arm in the open position so that the connector is inside an object being spread apart by spreading tool.

Effort is applied to handle 116 out past the axis or fulcrum to the end of handle 116 by virtue of the thumb placement on lateral member 118. This places the fulcrum between the effort (i.e., handle 116) and the resistance (i.e., the object being spread that is positioned between engagement end 108 of first arm and engagement end 112 of second arm) to create what is known as a first class lever where the fulcrum is between the effort and the resistance. In this class one lever mechanism the effort is determined by the ratio of the distance from the fulcrum to both the effort and the resistance.

FIG. 2 illustrates how spreading tool 100 can be held while in the closed position. Engagement end 108 of first arm 102 and engagement end 112 of second arm 104 are engaged with the object to be spread. The illustrative example is the rib cage of a carcass. FIG. 3 illustrates spreading tool 100 in the partially open position. Handle 116 is rotated counter clockwise around the axis or fulcrum as second arm 104 rotates with respect to the first arm 102 causing first arm 102 and second arm 104 to separate, as shown in FIG. 3.

FIG. 4 illustrate spreading tool 100 in the open position. The axis or fulcrum is moved forward of first arm 102 and second arm 104 with the rib cage spread. A stop contact 136 is provided to stop the rotation of first arm 102. An upward 30 degree angle bend in handle 116 and an identical 30 degree angle bend in longitudinal member 122 positions lateral member 118 above the operating plane of the tool. With reference to FIG. 4, there is a horizontal plane created by first arm 102 and second arm 104. The bend in lateral member 122 creates a stop/contact point between first arm 102 and lateral member 122 to stop rotation of first arm 102. Stop contact 136 securely holds the rib cage in the open position. The bend in handle 116 can be between an angle of twenty degrees to thirty-five degrees or any angle in between.

More specifically, first arm 102 further comprises an elbow 126 between pivot end 106 and engagement end 108. Second arm 104 further comprises an elbow 128 between pivot end 110 and engagement end 112. Elbow 126 and elbow 128 can position the respective engagement end 108, 112 at a 30 degree angle with respect to the corresponding pivot end 106, 110. Elbow 126 on the first arm 102 and elbow 128 on second arm 104 cooperate to position connector 114 in the open position (from a plan view perspective) in front of engagement end 108 of the first arm 102 and engagement end 112 of second arm 104. Accordingly, handle 116 is positioned inside the object being spread. The angle of elbow 126 and elbow 128 can be any value between 25 degrees and 35 degrees though it is useful that when spreading tool 100 is in the open position, handle 116 is out of the way inside the object being spread (as shown in FIG. 4).

The foregoing description of spreading tool 100 is useful in many applications where two objects need to be spread and held separately. The illustrations show particular utility for spreading open an animal rib cage, but one skilled in the art can see applicability in the medical field. Spreading tool could also be useful in mechanical situations where it is necessary to hold open a biased device. Accordingly, engagement end 108, 112 can take many configurations. The illustrated embodiment shows engagement end 108, 112 having forked tines though a single sharp tine can be used or ends particularly adapted for any of the foregoing uses can be used.

To those skilled in the art to which this invention relates, many changes in construction and widely differing embodiments and applications of the invention can suggest themselves without departing from the spirit and scope of the invention. The disclosures and the descriptions herein are purely illustrative and are not intended to be in any sense limiting. Various aspects of the different embodiments can be combined in different combinations to create new embodiments within the scope of the invention.

What is claimed is:

1. A spreading tool comprising:
a first arm having a pivot end and an engagement end;
a second arm having a pivot end and an engagement end;
a connector combining the pivot end of the first arm with the pivot end of the second arm to allow rotational movement of the second arm with respect to the first arm between a closed and open position;
a handle combined to the second arm, wherein the handle extends longitudinally with respect to the second arm;
and an axis extending through the connector, and wherein the handle rotates counter clockwise around the axis as the second arm rotates with respect to the first arm to the open position, wherein the first arm further comprises an elbow between the pivot end and the engagement end, and the second arm further comprises an elbow between the pivot end and the engagement end, wherein the elbow on the first end and the elbow on the second end cooperate to position the connector in the open position from a plan view perspective in front of the engagement end of the first arm and the engagement of the second arm.

2. The spreading tool of claim 1, wherein the handle has a center that is laterally aligned with the axis.

3. The spreading tool of claim 2, and further comprising a first longitudinal member combined to the second arm and a lateral member on each side of the first longitudinal member extending laterally with respect to a length of the first longitudinal member, and the handle extending between the lateral member on each side of the first longitudinal member and positioned a part from the first longitudinal member.

4. A spreading tool comprising:
a first arm having a pivot end and an engagement end;
a second arm having a pivot end and an engagement end;
a connector combining the pivot end of the first arm with the pivot end of the second arm; and
a handle combined to the second arm and positioned apart from the connector so that the connector is positioned between the handle and the engagement end of the first arm and the engagement end of the second arm for an entire path of travel as the engagement end of the first arm and the engagement end of the second arm move from a closed position to an open position, wherein the handle extends partially length wise of the second arm and generally at least one inch from the second arm in order to provide sufficient distance for a user to wrap fingers around the handle, wherein the first arm further comprises an elbow between the pivot end and the engagement end, and the second arm further comprises an elbow between the pivot end and the engagement end, wherein the elbow on the first end and the elbow on the second end cooperate to position the connector in the open position from a plan view perspective in front of the engagement end of the first arm and the engagement of the second arm.

5. The spreading tool of claim 4, wherein the handle has a center that is laterally aligned with the connector.

6. A spreading tool comprising:
a first arm having a pivot end and an engagement end;
a second arm having a pivot end and an engagement end;
a connector combining the pivot end of the first arm with the pivot end of the second arm; and
a handle combined to the second arm and positioned apart from the connector so that the connector is positioned between the handle and the engagement end of the first arm and the engagement end of the second arm for an entire path of travel as the engagement end of the first arm and the engagement end of the second arm move from a closed position to an open position, and further comprising a first longitudinal member combined to the second arm and a lateral member on each side of the first longitudinal member and the handle extending between the lateral member on each side of the first longitudinal member and positioned a part from the first longitudinal member.

7. The spreading tool of claim 6, wherein the engagement end of the first arm and the engagement end of the second arm comprises a forked tines for penetrating flesh on each side of an animals rib cage.

8. The spreading tool of claim 6, wherein the connector moves past an over center position as the engagement end of the first arm and the engagement end of the second arm move from the closed position to the open position.

9. The spreading tool of claim 8, wherein the connector is positioned behind the engagement end of the first arm and the engagement end of the second arm in the closed position and moves in front of the engagement end of the first arm and the engagement end of the second arm in the open position so that the connector is inside an object being spread apart by spreading tool.

10. The spreading tool of claim 8, and further comprising a stop contact to stop movement of the first arm with respect to the second arm.

11. The spreading tool of claim 6, wherein the handle further comprises a bend having an angle of twenty degrees to thirty-five degrees to position a portion of the handle above an operating plane of the engagement end of the first arm and the engagement end of the second arm.

12. The spreading tool of claim 11, wherein the angle thirty degrees.

* * * * *